United States Patent Office 3,501,571
Patented Mar. 17, 1970

3,501,571
NOVEL SILICONE COMPOSITIONS AND METHOD OF PREPARING SAME
John Kai-Ching Yen, Lachine, Quebec, Canada, assignor to Smith Kline & French Laboratories, Philadelphia, Pa., a corporation of Pennsylvania
No Drawing. Filed Nov. 18, 1966, Ser. No. 595,336
Claims priority, application Canada, Dec. 6, 1965, 947,065
Int. Cl. A61k 27/00
U.S. Cl. 424—157        8 Claims

ABSTRACT OF THE DISCLOSURE

Silicone-antacid compositions having rapid defoaming action and a method of preparing said compositions whereby separate granulations containing an antacid and an adsorbent inert filler on which silicone is adsorbed are prepared.

---

This invention relates to novel silicone compositions and to the method of preparing these compositions. More particularly, the method of this invention produces a silicone-antacid composition which possesses a much more rapid defoaming action than do previously available silicone compositions.

The organopolysiloxanes have a wide variety of uses. One of the most important includes therapeutic utility. For example, in veterinary practice these compounds are used for treating frothy bloat in ruminants and tympanic colic in horses. In humans the organopolysiloxanes have been employed for the treatment of gastritis and abdominal distension.

It has further been previously reported that the joint use of an organopolysiloxane and an antacid gives enhanced effectiveness that could not have been achieved from use of the individual constituent. They are usually combined in the form of a tablet. In the prior art compositions the antacid acts as an absorbent being coated by the viscous polysiloxane. Upon administration and disintegration of the tablet the particles of antacid are then widely dispersed throughout the gastrointestinal tract carrying with them the organopolysiloxane which sticks to and protects the surfaces of the tract. Presently there are several commercial tablets available which comprise a viscous polysiloxane homogeneously dispersed throughout an antacid and which operate by the above mechanism.

The above commercial and other known tablets which contain an antacid and silicone are prepared by the conventional pharmaceutical method. The silicone is dispersed throughout the antacid plus the other tablet ingredients. The powder is then granulated and compressed into a tablet. This method of dispersing the organopolysiloxane and granulating produces granules and a tablet having relatively slow antifoaming action. A further disadvantage of preparing a silicone antacid tablet by this prior art method is that upon shelf storage the defoaming action of the tablet slows down drastically. In other words, the silicone-antacid tablet prepared by the conventional method not only demonstrates slow defoaming action but also exhibits poor stability during shelf storage. A still further disadvantage of the above method is that uniform distribution of the silicone is difficult to achieve when the silicone is dispersed in all the powders during preparation of the tablet.

It is therefore the object of this invention to provide a novel method of manufacturing silicone compositions which results in a rapid defoaming action of the silicone ingredient and which upon prolonged shelf storage maintains good defomaing activity.

The method and compositions in accordance with this invention eliminates the above disadvantages associated with the prior art silicone-antacid tablets. The novel method as disclosed by the applicant produces compositions which possess rapid defoaming action of the organopolysiloxane. Further, it has been discovered that upon prolonged shelf storage these compositions do not lose their rapid defoaming action. The products of this invention therefore provide immediate relief to the distressed patient.

It has been discovered that when the silicone is dispersed in all the powders, in particular the antacid, the phenomena of *absorption* takes place. These compounds which absorb the silicone have none or very little silicone on their surfaces. This in turn presents a minimum, if any, exposed surface area of the silicone compound available for antifoaming action until the antacid matrix breaks down. On the other hand, it has been unexpectedly discovered that certain filling compounds display an *adsorption phenomena*. The silicone is thus retained on the surface of the compounds and thereby a maximum surface area of the silicone is immediately available for rapid and more efficient defoaming action.

The method as disclosed hereinafter teaches an improved process of dispersion of the silicone and granulation of the various ingredients used to prepare a tablet. This novel method results in granules and a tablet which provide for more surface area of the silicone compound to be available for antifoaming action and, thus, results in rapid defoaming action. Further, it has unexpectedly been found that the present method of adsorbing the silicone gives good uniform distribution of silicone in the granulation.

The method of this invention comprises adsorbing a liquid organopolysiloxane on an inert adsorbent filler compound and granulating this mixture. The antacid material is then separately granulated and the dried granules are mixed together and compressed. Alternatively the granules can be compressed into a layered tablet, filled into hard gelatin capsules or dispersed as the granules per se.

The separate granulations are prepared by methods well known to the art. For example, the ingredients described herein are wet with a binder in aqueous solution to form a granulation. The granulation is then oven dried and the dried granulation is milled into granules having a size of from 14 mesh to about 100 mesh.

In accordance with this invention it was unexpectedly discovered that certain compounds have a tendency to adsorb rather than absorb the silicone. These compounds were found to be excellent carriers for the silicone and produced compositions having rapid defoaming action. The compounds which have this adsorption characteristic with silicone are, for example, carbohydrates such as lactose, mannitol, sorbitol, sucrose, icing sugar (3% starch, 97% sucrose), dextrose, amylose, maltose, fructose, xylose, starch, cellulose compounds; fillers such as, for example, calcium sulfate, sodium phosphate, glycine, starch, non-fat dried milks and fillers of similar physiochemical nature. Preferably the adsorbent filler used in this invention will be, for example, lactose, mannitol, sorbitol, sucrose and dextrose. The above adsorbents are present in the total solids from about 5% to about 50%.

The silicone compound will be a liquid, oily or semisolid organopolysiloxane represented by the following general formula:

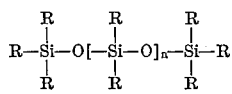

where R represents a lower alkyl group not exceeding five carbon atoms or an organic radical such as phenyl and $n$ can be from 0 to 2000. Most advantageously the polysiloxanes will be methylpolysiloxane of at least 200 cs. viscosity at 25° C., preferably with a viscosity of between 250 and 1000 cs. at 25° C.

The antacid employed may be any of the conventional gastric antacids well known to the art, such as, for example, magnesium hydroxide, aluminum hydroxide, aluminum oxyhydroxide, magnesium carbonate, calcium carbonate, magnesium oxide, dihydroxy aluminum aminoacetate, aluminum phosphate, bismuth subcarbonate, and magnesium trisilicate or combinations thereof.

Most advantageously the invention is applicable to dosage unit forms, such as, for example, granules, tablets or soft gelatin capsules containing said granules. The antacid will be present in the dosage unit form from about 0.1 gm. to about 1.0 gm. and the organopolysiloxane will be present from about 10 mg. to about 100 mg. or the ratio of the silicone to the antacid is from about 1% to about 100%.

In a preferred embodiment the granules comprising the combination of an antacid and an organopolysiloxane are tableted. Advantageously the granules are compressed into a chewable tablet. If necessary, any inert filler, binder or lubricant employed in the tableting art may be mixed with the above listed adsorbents and antacids before tableting. Conventional inert fillers, such as, for example, corn starch or other like therapeutically inert substances may be used. Where a lubricant is advantageously employed it may be magnesium stearate, talc, stearic acid, sodium benzoate or mixtures thereof. If binders are necessary to insure adequate cohesiveness natural gums and gum constituents, as for example, acacia, tragacanth, agar and pectin may be employed. Further, exemplary of binders would be, for example, cellulose esters, polyvinylpyrrolidone and proteinaceous material such as, for example, gelatin, casein and zein.

It will be evident to one skilled in the art that the filler, binder and lubricant are standard pharmaceutical tools used commonly in granulating methods and are not an essential aspect of this invention, therefore they can be varied broadly.

The granules prepared from the above method comprise an antacid and an adsorbent inert filler on which silicone is adsorbed. These granules can now be employed to produce a dosage unit having a much faster defoaming action than previously available silicone-antacid combinations.

The following in vitro method was employed to compare the defoaming action of a tablet made by the conventional method of dispersing the silicone in all powders, three different commercially available silicone antacid tablets and the tablet prepared from following the method of the present invention. The results are presented below in Table I.

Exactly 40 ml. of distilled water is placed into a 120 ml. beaker. Four drops of Tween 20 (polyoxyethylene sorbitan monolaurate) is added to the water as a foam producing agent. The liquid is stirred by a Brookfield counter rotating mixer for exactly 15 seconds, setting the variable speed gauge to 40, making sure that the two propellers are at the same level each time. The contents of the beaker are immediately poured into a 100 ml. glass stoppered graduate. When the water level reaches 30 ml. and the foam level reaches 90 ml., i.e., foam from 30 ml. to 90 ml., the silicone-antacid tablet which has been previously passed through a No. 20 mesh screen is added. The graduate is inverted for three seconds and then placed on the work bench. The stopwatch is immediately started and readings, time in seconds, are taken when the foam level drops from the original 90 ml. to 65 ml. and then to 44 ml.

The amount of foam produced each time and its depth is reproducible and the foam level reaches 90 ml. in the graduate each time the test is repeated.

TABLE I

| Silicone antacid tablet of present invention | Conventional method of preparing silicone antacid tablet | Commercial Tablet I | Commercial Tablet II | Commercial Tablet III |
|---|---|---|---|---|
| Seconds for Foam to Reach Level of— | | | | |
| 65 ml./26* | 65 ml./204* | 65 ml./315* | 65 ml./189* | 65 ml./472* |
| 44 ml./52* | 44 ml./706* | 44 m./1,566* | 44 ml./861* | 44 ml./943* |

*Mean of three readings.

It will be noted that the defoaming time of the tablet prepared by the present invention is dramatically faster than the other tablets. For example, it takes only 26 seconds for the foam level to reach 65 ml. with the silicone-antacid tablet of the present invention. On the other hand, it takes from over three to eight minutes for the other tablets to reach this level.

However, the most significant feature of the defoaming action is that once the defoaming starts in the tablet of the present invention it continues rapidly. It takes only 26 more seconds for the foam level to drop from 65 ml. to 44 ml. or a total of 52 seconds. The other tablets demonstrate a very significant slow down in defoaming action after the 65 ml. level is reached. The defoaming time of the other tablets ranges from eight to twenty minutes to drop from the level of 65 ml. to 44 ml.

In summary, it can be observed from the above table that the method and tablet of the present invention produced a much more rapid defoaming action than previously known or commercially available tablets. It has been demonstrated that where the tablet of the present invention takes only 52 seconds to produce a certain amount of defoaming (44 ml. level) other silicone-antacid tablets range from approximately 11 to 26 minutes to produce the same amount.

The invention will be further clarified by the following specific examples. These examples are not limiting but are used to make obvious to one skilled in the art the full practice of the method of this invention.

EXAMPLE 1

First granulation

Ingredients: Mg./tablet
Aluminum hydroxide _____ 200
Magnesium hydroxide _____ 200
Mannitol _____ 175
Dextrose _____ 100
Starch, pregelatinized _____ 15

The first four ingredients are mixed together and granulated with 5% pregelatinized starch paste. The granulation is dried overnight at 110° F. The dried granulation is then passed through a No. 20 mesh screen.

Second granulation

Ingredients: Mg./tablet
Organopolysiloxane _____ 27.0
Mannitol _____ 125
Dextrose _____ 50
Special icing sugar _____ 150
FD & C Blue No. 1 _____ 0.02

The mannitol and silicone are mixed together and passed through a No. 20 mesh screen. The dextrose and icing sugar are then added and this mixture is granulated with just enough colored water to make the granulation wet. The granulation is dried overnight at 110° F. and passed through a No. 14 mesh screen.

| Ingredients: | Mg./tablet |
|---|---|
| Granulation I | 690 |
| Granulation II | 352 |
| Sorbitol powder | 30 |
| Talcum | 30 |
| Magnesium stearate | 7 |

Granulations I and II are blended and thoroughly mixed with the other tablet ingredients. The mixture is then compressed into tablets weighing approximately 1.1 gms.

Alternatively Granulations I and II may be compressed into a layered tablet by using a multilayer rotating tablet press. Either a two or three layered tablet may be formed.

EXAMPLE 2

Two separate granulations are prepared as outlined in Example 1. The dried granules are blended and then filled into a hard gelatin capsule.

I claim:
1. The method of preparing a silicone-antacid pharmaceutical product having rapid defoaming action which comprises preparing a first granulation comprising an adsorbent inert filler comprising sorbitol, mannitol, lactose, sucrose, icing sugar, dextrose, amylose, maltose, fructose, xylose, starch, calcium sulfate, sodium phosphate, glycine or non-fat dried milk on which a liquid, oily or semi-solid organopolysiloxane having the following structural formula:

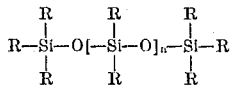

where R represents a lower alkyl group not exceeding five carbon atoms or phenyl and $n$ is from 0 to 2000 is adsorbed, preparing a second granulation comprising an antacid and being free of organopolysiloxane and mixing the separate granulations to form granules comprising from about 5% to about 50% of said adsorbent filler from about 10 mg. to about 100 mg. of said organopolysiloxane and from about 0.1 gm. to about 1.0 gm. of said antacid, said granulations having a powder size of from about 14 mesh to about 100 mesh.

2. The method of claim 1 wherein the adsorbent inert filler is lactose, mannitrol, sorbital, sucrose or dextrose.

3. The method of claim 1 wherein the organopolysiloxane is a methylpolysiloxane.

4. The method of claim 1 wherein the granulation is compressed into a tablet.

5. The method of claim 1 wherein the granulation is placed in a hard gelatin capsule.

6. A silicone-antacid pharmaceutical composition having rapid defoaming action prepared in accordance with the method of claim 1.

7. The method of claim 1 wherein the antacid is aluminum hydroxide and calcium carbonate and the adsorbent inert filler is icing sugar and mannitol.

8. A silicone-antacid pharmaceutical tablet having rapid defoaming action prepared in accordance with the method of claim 4.

References Cited

UNITED STATES PATENTS

| 2,477,080 | 7/1949 | Necheles et al. | 167—55 |
| Re. 25,205 | 7/1962 | Feinstone | 167—55 |
| 3,378,440 | 4/1968 | Rowan et al. | 167—55 |
| 3,382,150 | 5/1968 | Grass et al. | 424—184 |

ALBERT T. MEYERS, Primary Examiner

D. M. STEPHENS, Assistant Examiner

U.S. Cl. X.R.

424—20, 78, 128, 154, 155, 156, 184